(12) United States Patent
Munn

(10) Patent No.: US 12,413,945 B2
(45) Date of Patent: Sep. 9, 2025

(54) SYSTEMS AND METHODS FOR AUTOMATION OF END-TO-END NETWORK SLICE DEPLOYMENT

(71) Applicant: Verizon Patent and Licensing Inc., Basking Ridge, NJ (US)

(72) Inventor: Jude M. Munn, Pittsburg, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 361 days.

(21) Appl. No.: 18/297,059

(22) Filed: Apr. 7, 2023

(65) Prior Publication Data

US 2024/0340619 A1    Oct. 10, 2024

(51) Int. Cl.
*H04W 4/50* (2018.01)
*H04L 41/0895* (2022.01)
*H04L 41/122* (2022.01)
*H04L 41/40* (2022.01)

(52) U.S. Cl.
CPC ........... *H04W 4/50* (2018.02); *H04L 41/0895* (2022.05); *H04L 41/122* (2022.05); *H04L 41/40* (2022.05)

(58) Field of Classification Search
CPC ... H04L 41/0843; H04L 41/122; H04L 41/40; H04L 41/0895; H04L 41/0806; H04L 41/5048; H04W 4/50
See application file for complete search history.

(56) References Cited

U.S. PATENT DOCUMENTS

| | | |
|---|---|---|
| 2021/0051070 A1* | 2/2021 | Akman .................... H04W 4/50 |
| 2023/0140034 A1* | 5/2023 | Bui ...................... H04L 41/0806 709/203 |
| 2024/0146454 A1* | 5/2024 | Davydov .............. H04L 1/0041 |

* cited by examiner

*Primary Examiner* — Muhammad N Edun (57) ABSTRACT

Systems and methods described herein enable automation of network slice deployments. A network device stores a group of preconfigured templates for different slice segments of a data transport network and identifies customer parameters for a slice. The network device retrieves a first template that satisfies the customer parameters for a first slice segment and generates a first segment design for the slice. The network device retrieves a second template that supports the first segment design and customer parameters for a second slice segment and generates at least one second segment design for the slice. The network device assembles an end-to-end slice design using the first segment design and the at least one second segment design and forwards the end-to-end slice design to a deployment system for the data transport network.

20 Claims, 7 Drawing Sheets

SYSTEMS AND METHODS FOR AUTOMATION OF END-TO-END NETWORK SLICE DEPLOYMENT

BACKGROUND

Next Generation mobile networks, such as Fifth Generation (5G) mobile networks, are being deployed as the next evolution of mobile wireless networks. 5G mobile networks are designed to increase data transfer rates, increase spectral efficiency, improve coverage, improve capacity, and reduce latency. For example, a 5G network may incorporate "network slicing" technology to increase network efficiency and performance.

Network slicing is a type of virtualized networking architecture that involves partitioning of a single physical network into multiple virtual networks. The partitions, or "slices," of the virtualized network may be customized to meet the specific needs of applications, services, devices, customers, or operators. Each network slice can have its own architecture, provisioning management, and security that supports a particular application or service. Bandwidth, capacity, and connectivity functions are allocated within each network slice to meet the requirements of the particular network slice. Network slicing may be implemented in a dynamic fashion, such that the slices of the virtualized network may change over time and may be re-customized to meet new or changing needs of applications, services, devices, customers, or operators. However, designing and building network slices is currently a labor-intensive process.

DETAILED DESCRIPTION OF EXAMPLE EMBODIMENTS

The following detailed description refers to the accompanying drawings. The same reference numbers in different drawings may identify the same or similar elements. Also, the following detailed description does not limit the invention.

Virtualized radio access networks (RANs) and virtualized transport domains involve the use of network functions virtualization (NFV) and software defined networks (SDNs) to virtualize a portion of the RANs and transport domains on standard information technology (IT) and commercial off-the-shelf (COTS) hardware. Virtualized RANs and transport domains offer a number of advantages, including a flexible and scalable architecture that enables dynamic load-balancing, intelligent traffic steering, and latency reduction using local caching. Virtualization of RANs and transport domains is particularly useful for implementing network slicing. Network slicing, through the use of NFV and SDNs, enables Next Generation mobile networks to offer a variety of services that demand different network performances for different combinations of RAN and transport domains.

Systems and methods described herein relate to end-to-end design of network slices. The systems and methods enable automation of network slice deployments. Modular parts of basic network infrastructure may be modified and assembled to meet a customer's network slice requirements. A slice planning tool (e.g., operating on a network device or computing device) may store a group of preconfigured templates for different modular parts of a network slice (referred to herein as slice segments) in a data transport network and may identify customer parameters for a new slice. Customer input may govern selection of the preconfigured templates for the different slice segments and the selected templates may be modified to meet customer requirements and conform to configurations of another segment in the customer's slice. Once each slice segment is configured, the slice planning tool may assemble the individual segment designs into an end-to-end slice design for deployment.

In contrast with implementations described herein, conventional cloud platform planning tools generate an output for a new network slice that a design team enters into a cut sheet and/or spreadsheet file. Data from the cut sheet must be entered (e.g., typically by hand) into an application design tool that generates a remedy ticket for a human to build a tenant space, and then another ticket is run to create new ports for the new network slice. Implementations described herein collect customer requirements and slice definitions once via a slice planning tool that can assemble successive stages and initiate an orchestration process.

Figure 1:
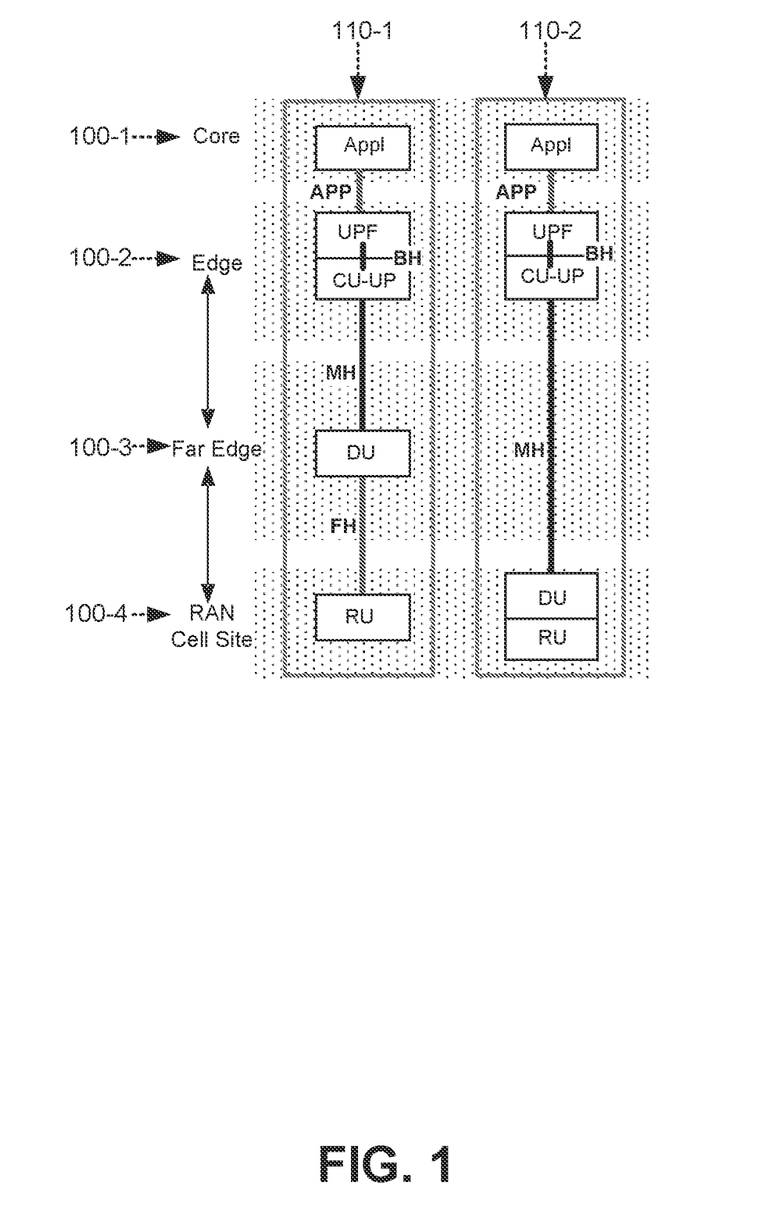
FIG. 1 illustrate concepts described herein.

FIG. 1 illustrates network service slice arrangements that may be used with exemplary embodiments described herein. As shown, a network service slice infrastructure design may be implemented across multiple networks, from a core network 100-1, to an edge network 100-2, to a far edge network 100-3, and out to a cell site 100-4 in a Radio Access Network (RAN). The service slice infrastructure design includes different transport domains, such as, for example, backhaul, midhaul, and fronthaul transport domains, which may span the different networks shown in FIG. 1.

In one example of a network service slice infrastructure design, shown at 110-1, an application ("Appl") resides in the core network 100-1 and connects to a User Plane Function ("UPF") in the edge network 100-2 via an application ("APP") transport domain. The UPF in design 110-1 may be co-located, in edge network 100-2, with a Central Unit-User Plane (CU-UP) (e.g., at a same group of network devices). The UPF and CU-UP in design 110-1 connect with one another via a backhaul ("BH") transport domain. The BH transport domain includes the intermediate link(s) between transport nodes (e.g., UPF) in, or close to, the core network and transport nodes (e.g., CU-UP) in one or more edge networks. The CU-UP in edge network 100-2 connects to a RAN Distributed Unit (DU) via a midhaul ("MH") transport domain located in far edge network 100-3. The MH transport domain includes the intermediate link(s) between transport nodes (e.g., CU-UPs) close to the core network and the radio controllers (e.g., DUs) in a wireless network. The DU connects to a RAN Remote Unit (RU) at the RAN cell site 100-4 via a fronthaul ("FH") transport domain. The FH transport domain includes the intermediate link(s) between the radio controllers (e.g., DUs) and the radio heads (e.g., RUs) in a wireless network.

In another example of a network service slice infrastructure design, shown at 110-2, an application resides in the core network 100-1 and connects to a UPF in the edge network 100-2. The UPF in design 110-1 may be co-located, in edge network 100-2, with a CU-UP (e.g., at a same group of network devices 215 shown in FIG. 2). The UPF and CU-UP in design 110-2 connect with one another via a BH transport domain. The CU-UP in edge network 100-2 connects to a DU, located at a RAN cell site 100-4, via a MH transport domain. The DU connects to a RU at the RAN cell site 100-4 via a FH transport domain. The DU and RU in design 110-2 may be co-located, at RAN cell site 100-4.

Other designs, having different configurations than those shown, may be used with the exemplary embodiments described herein. For example, in other arrangements, an application may be located with the UPF and CU-UP in edge network 100-2 to provide low-latency communications (LLC) or in far edge network 100-3 to provide ultra-low-latency communications (ULLC).

In the example of FIG. 1, RAN cell site 100-4 may be included in a 5G RAN, a future generation RAN (e.g., a Sixth Generation (6G) RAN, a Seventh Generation (7G) RAN, or a subsequent generation RAN), a centralized-RAN (C-RAN), an Open Radio Access Network (O-RAN), and/or another type of radio access network. The RAN may be implemented according to service levels and various wireless standards, frequencies, bands, and segments of radio spectrum, and/or other attributes or technologies used for radio communication. For example, a customer may have different service level options that are primarily controlled at the RAN level and can be provided through different network slices. Slice subscriptions for a customer may include, for example, different purchase options and performance criteria (e.g., latency, throughput, reliability, availability, redundancy, etc.) available for a requested network slice.

Next Generation mobile networks typically include multiple transport domains, such as, for example, FH, MH and BH transport domains, with each transport domain having its own unique and complex characteristics. Each transport domain may operate to serve one or more network slices. Network infrastructure design may include multiple different transport domains that interconnect and operate to service the traffic of one or more network slices. While deploying and managing network slices for customers with specific service requirements (e.g., specific Service Level Agreements (SLAs)), determining which transport domain to orchestrate, manage, and control to optimally and most efficiently maintain those requirements becomes a complicated proposition. Other aspects of network slicing that may need to be defined for each customer's network slice may include different charging profiles, roaming options, reporting standards, security levels, exposure requirements, operations support system (OSS) or business support system (BSS) parameters, and the like.

Figure 2:
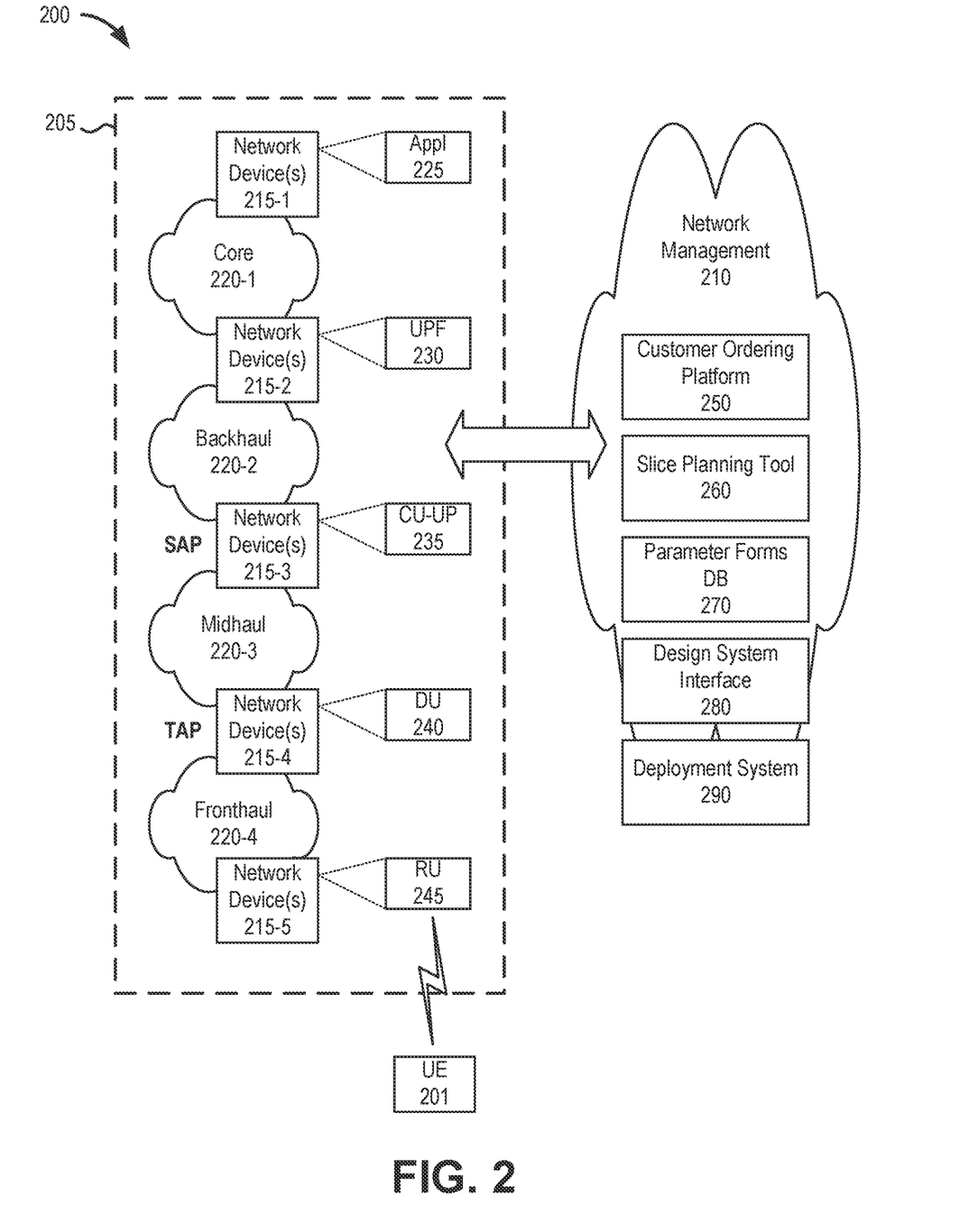
FIG. 2 illustrates an example network environment in which end-to-end network slicing deployments may be implemented.

FIG. 2 illustrates an exemplary network environment 200 in which end-to-end network slicing deployment, as described herein, may be implemented. Network environment 200 includes a data transport network section 205 and a network management network section 210. Data transport network section 205 may include multiple groups of network devices (or data centers) 215-1 through 215-5, interconnected via respective transport domains 220-1 through 220-4. In the exemplary implementation shown in FIG. 2, an application 225 may be installed at network device 215-1, a UPF 230 may be installed at network device 215-2, a CU-UP 235 may be installed at network device 215-3, a DU 240 may be installed at network device 215-4, and a RU 245 may be installed at network device 215-5.

The application 225 may include any type of application that sends data to, and/or receives data from, a user equipment device (UE), such as UE 201, wirelessly connected to a RAN cell site. Application 225 may be installed at data center 215-1, or in another network device connected to core transport domain 220-1. UPF 230 includes a logical node that hosts packet routing and forwarding, policy enforcement, and data buffering functions, and includes functionality for interconnecting with an external Data Network (not shown) (e.g., the Internet). In one implementation, UPF 230 may be implemented as a Virtual Network Function (VNF) or Cloud-native Network Function (CNF) and installed at data center 215-2. CU-UP 235 includes a logical node that hosts user plane functions, such as, for example, data routing and transport functions. In one implementation, CU-UP 235 may be implemented as a VNF or CNF and installed at data center 215-3.

DU 240 includes a logical node that hosts functions associated with the Radio Link Control (RLC) layer, the Medium Access Control (MAC) layer, and the physical (PHY) layer. In one implementation, DU 240 may be implemented as a VNF or CNF and installed at data center 215-4. RU 245 may include at least one radio transceiver, and associated antenna(s), for radio frequency (RF) wireless communication with one or more UEs 201. RU 245 may additionally include a logical node that operates and controls the at least one radio transceiver. In one implementation, the logical node of RU 245 may be implemented as a VNF or CNF and installed at data center 215-5. DU 240 and RU 245 together may be components of a New Radio (NR) Next Generation gNodeB used in the RAN of a Next Generation mobile network, such as, for example, a 5G mobile network. UE 201 may include any type of electronic device having a wireless capability (e.g., a Radio Frequency (RF) transceiver) to communicate with RU 245. Each of UEs 201 may include, for example, a computer (e.g., desktop, laptop, tablet, or wearable computer), a personal digital assistant (PDA), a "smart" phone, or a "Machine-to-Machine" (M2M) or "Internet of Things" (IoT) device. A "user" (not shown) may own, operate, and/or administer each UE.

As shown in FIG. 2, core transport domain 220-1 may interconnect application 225 and UPF 230, backhaul transport domain 220-2 may interconnect UPF 230 and CU-UP 235, midhaul transport domain 220-3 may interconnect CU-UP 235 and DU 240, and fronthaul transport domain 220-4 may interconnect DU 240 and RU 245. Core transport domain 220-1, backhaul transport domain 220-2, midhaul transport domain 220-3, and fronthaul transport domain 220-4 may each include a transport network that further includes one or more links for interconnecting respective network devices 215. In the network environment 200 of FIG. 2, data may be transported, for example, from application 225 to RU 245 (for wireless transmission to a destination UE 201) via UPF 230, CU-UP 235, DU 240 and via the interconnected transport domains 220-1 through 220-4. Furthermore, data (e.g., received from a UE 201 via wireless transmission) may be transported from RU 245 to application 225 via DU 240, CU-UP 235, UPF 230 and via the interconnected transport domains 220-4 through 220-1.

Network management section 210 of network environment 200 may include a customer ordering platform 250, a slice planning tool 260, a parameter forms database (DB) 270, a design system interface 280, and a deployment system 290.

Customer ordering platform 250 may include network devices that provide a web-based interface for a customer (e.g., using a user device) to access a slice ordering service. Via the user device, users (e.g., customers) of data transport network section 205 may access customer ordering platform 250 to manage (e.g., order, configure, issue commands, update, monitor, etc.) network slices for new applications (e.g., applications 225) or services, for example. Using customer ordering platform 250, customers may enter their network slice/service configurations with selected eligible parameters supported by data transport network section 205. According to an implementation, customer ordering platform 250 may use a configuration information questionnaire (CIQ) as an initial inquiry tool. The CIQ typically lists possible NF or service attributes, which a vendor can select for setting on a per-site basis or a per-feature basis.

Slice planning tool 260 may include an automated platform to design slice components, including network function designs, service designs, and slice designs. A network function design may include a VNF or CNF that may be used to support a service. A service design may be an assembly of multiple network functions to support a given application or set of requirements for a network service. A slice design may be an end-to-end network path of network components and/or services. A resultant product from slice planning tool 260 may be a final slice service package that contains pieces, such as service, network functions, and associated slice configurations applicable to each network function that makes up a slice. In one implementation, the final slice service package may be a cloud services archive (CSAR) package (e.g., a ZIP file). The configuration design may be performed on the basis of a slice functioning in a particular environment (e.g., a site-specific configuration), such a particular data center for a network function virtualization infrastructure (NFVI) and/or a cloud computing platform.

According to one implementation, slice planning tool 260 may provide slice/service options for presentation on customer ordering platform 250 and receive customer selections. As described further herein, slice planning tool 260 may provide standardized network options and work through an iterative process to define a customer order. For example, slice planning tool 260 may assemble customized end-to-end slice designs from templates of different network components and transport domains (i.e., network slice segments) based on customer inputs.

Parameter forms DB 270 may include form templates associated with network slice services. Parameter forms DB 270 may include memory to store a group of preconfigured templates for different network slice segments of a data transport network. For example, parameter forms DB 270 may include tables or lists of different service requirements and/or specifications that can be entered by a customer to define a slice order. Individual parameter forms/templates may be defined, for example, for different network slice segments (e.g., RAN, midhaul transport, service aggregation point (SAP), transport aggregation point (TAP), etc.) as described further herein. Slice planning tool 260 may retrieve appropriate parameter forms from parameter forms DB 270 in response to customer input during an ordering process.

Design system interface 280 may provide communications to different network discover tools and/or design systems. For example, design system interface 280 may include one or more application programming interfaces (APIs) to interface with a network management system for network mapping and device discovery. According to one implementation, slice planning tool 260 may use design system interface 280 to query a network physical infrastructure, performance, and assigned usage. According to another implementation, slice planning tool 260 may use design system interface 280 to supplement information from parameter forms DB 270 (e.g., in response to customer input). For example, design system interface 280 may initiate an updated network map or verification of performance criteria to support a customer slice in a particular geographic area.

Deployment system 290 may include one or more network devices or computer devices to design and orchestrate network slices in data transport network section 205. Deployment system 290 may receive instructions from slice planning tool 260 that identify one or more transport domains 220 and/or VNFs/CNFs to orchestrate within data transport network section 205. Deployment system 290, based on the instructions from slice planning tool 260, may initiate a process of orchestrating particular transport domains and/or VNFs/CNFs in data transport network section 205.

Deployment system 290 may include multiple sub-components such as, for example, a slice inventory, a runtime slice orchestrator, a network function virtualization orchestrator (NFVO), and a virtual network function manager (VNFM). The slice inventory may include memory or database with an inventory of active (e.g., instantiated) slices associated with data transport network section 205. The runtime slice orchestrator may manage creation of network slices using information from slice planning tool 260. For example, the runtime slice orchestrator may be responsible for implementing instructions to instantiate, allocate, and activate network slices. The NFVO may create, remove, and/or update network functions, such as virtualized versions of core components (e.g., session management function (SMF), UPF, etc.) at a particular site (e.g., a data center, enterprise, multi-access edge computing (MEC), etc.). The VNFM may perform lifecycle management of particular VNFs, including instantiation, scaling, updating, and/or termination of particular VNFs based on instructions received from, for example, the runtime slice orchestrator.

The configuration of network components of network environment 200 shown in FIG. 2 is for illustrative purposes. Other configurations may be implemented. Therefore, network environment 200 may include additional, fewer and/or different components, that may be configured in a different arrangement, than that depicted in FIG. 2. For example, though application 225, UPF 230, CU-UP 235, DU 240, and RU 245 are shown as being installed at different network devices 215, one or more of application 225, UPF 230, CU-UP 235, DU 240, and RU 245 may be installed at a same network device 215. Additionally, though backhaul transport domain 220-2, midhaul transport domain 220-3, and fronthaul transport domain 220-4 are shown in FIG. 2 as being separate networks, that may have multiple links, in some implementations, these domains may be implemented as buses within a single network device 215, or as a short distance link (e.g., a short run of optical fiber) between two network devices 215.

Figure 3:
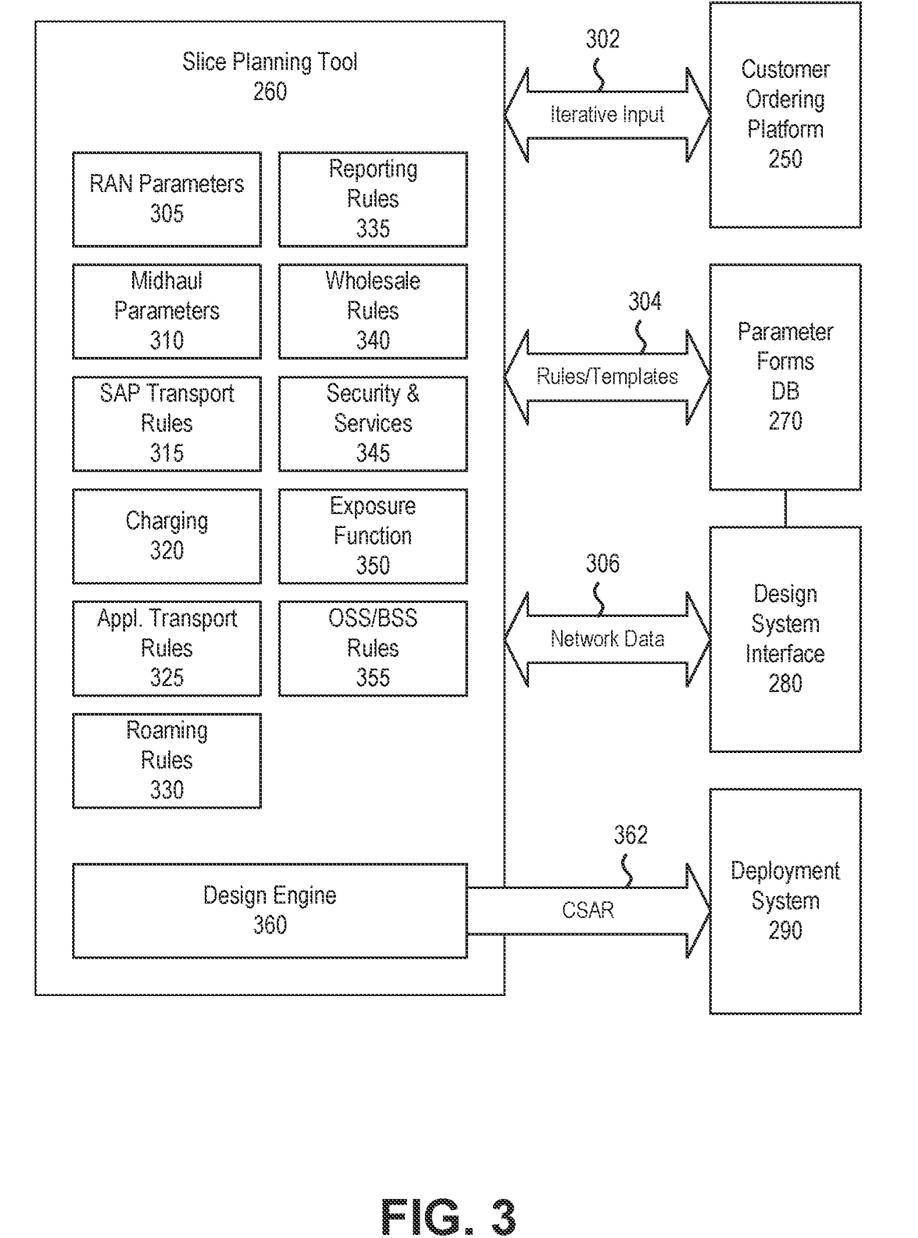
FIG. 3 is a diagram illustrating example components and communications associated with a slice planning tool, according to an implementation.

FIG. 3 is a diagram illustrating example components and communications associated with slice planning tool 260. As shown in FIG. 3, slice planning tool 260 may obtain iterative input 302, such as user input solicited and obtained via customer ordering platform 250. Slice planning tool 260 may obtain from parameter forms DB 270 rules and/or templates 304 to solicit different network slice parameters from customers and to assemble network slice segments. Slice planning tool 260 may also obtain, via design system interface 280, various network data 306 to supplement and/or confirm information in parameter forms DB 270 and compatibility with customer input 302.

As shown in FIG. 3, parameters may be defined for different network segments and features, such as RAN parameters 305, midhaul parameters 310, SAP transport rules 315, charging parameters 320, application transport rules 325, roaming rules 330, reporting rules 335, wholesale rules 340, security and services 345, exposure function 350, and OSS/BSS rules 355. Regarding RAN parameters 305, slices may be configured with different types of latency, throughput, reliability, availability, redundancy, etc. Some of these performance criteria may be grouped by a Quality of Service (QoS) level, a QoS Class Identifier (QCI for Non-Standalone Architecture)/5G QoS Identifier (5QI for Standalone Architecture), and/or different scheduling priorities. These QoS, QCI/5QI, and scheduler systems may be defined, and set to, for example, geographic areas as another design parameter. Customers, using customer ordering platform 250, may input and/or select RAN parameters to meet desired specifications for network slices to support, for example, a new application.

Figure 4:
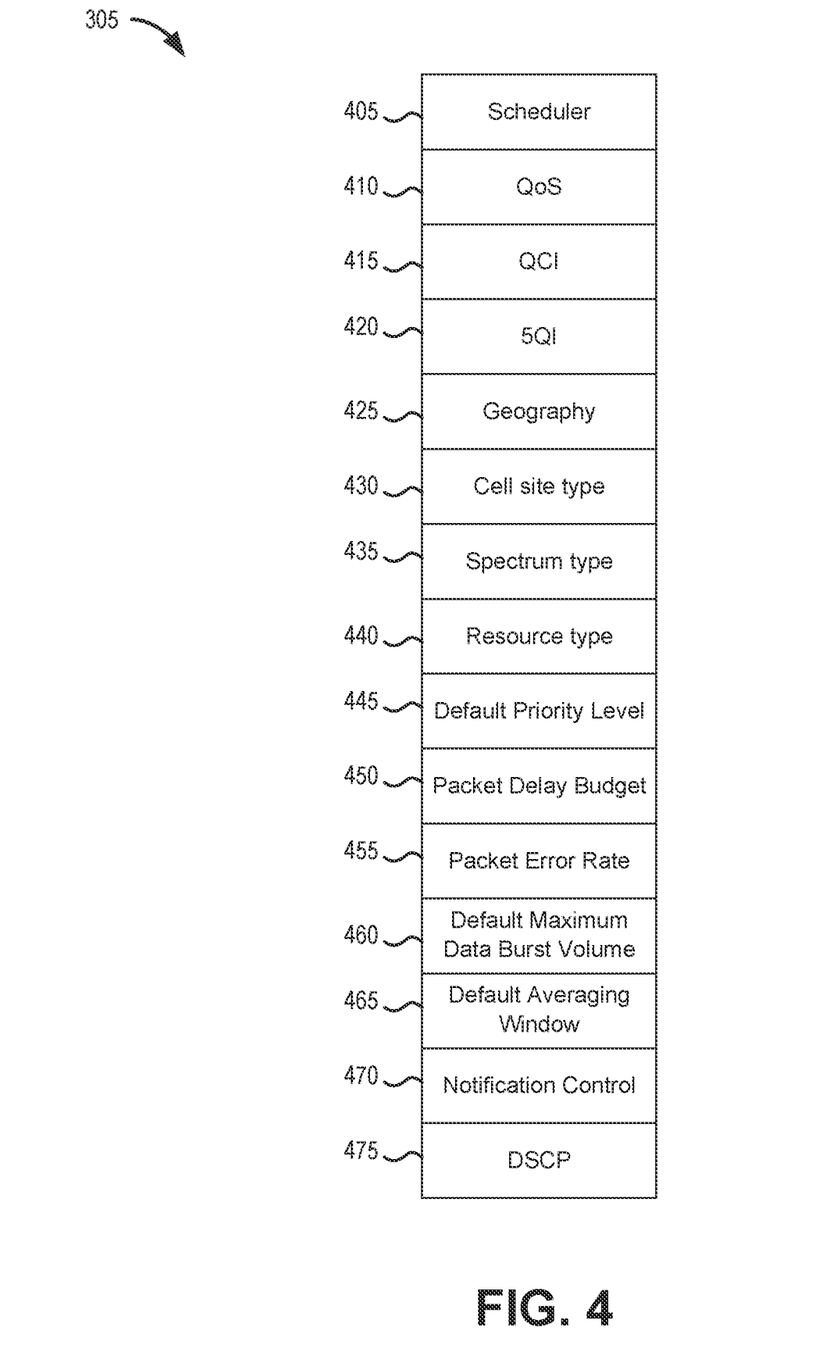
FIG. 4 is a diagram illustrating radio access network (RAN) parameters for the slice planning tool, according to an implementation.

RAN parameters 305 may include, for example, parameters illustrated in FIG. 4. As shown in FIG. 4, RAN parameters 305 may include a scheduler field 405, a Quality of Service (QoS) field 410, a QoS Class Identifier (QCI, for Non Stand Alone Architecture) field 415, a 5G QoS Identifier (5QI, for Stand Alone Architecture) field 420, a geography field 425, a cell type field 430, a spectrum type field 435, a resource type field 440, a default priority field 445, a packet delay budget field 450, a packet error rate field 455, a default maximum data burst volume field 460, a default averaging window field 465, a notification control field 470, and a Differentiated Services Code Point (DSCP) field 475.

Scheduler field 405 may indicate logic that schedules and assigns the required resource to network slices of access network 105. For example, a RAN scheduler may schedule and assign network resources of a RAN. As an example, in the RAN, radio resources may be allocated in time with time-division multiplexing (TDM), or in frequency with frequency-division multiplexing (FDM), or in space with space-division multiplexing (SDM), or some combination thereof, using centralized or decentralized dynamic scheduling across network slices. A scheduler may schedule and assign resources for RAN slices according to SLA requirements, QoS requirements, metric requirements, and/or other criterion pertaining to the access network, which may or may not be different from other networks (e.g., core network, etc.).

QoS field 410 may include a quality of service information for a requested slice. QCI field 415 and/or 5QI field 420 may indicate numerical QoS level corresponding to QoS field 410. Geography field 425 may include geographic service location information for requested slice access (e.g., local, regional, etc.). Geographic service location information may include, for example, tracking area IDs (TAIs), E-UTRAN cell global identifiers (ECGIs), enterprise network IDs, or other location parameters.

Cell site type field 430 may indicate a cell type (e.g., macro-cell, micro-cell, etc.). Spectrum type field 435 may indicate various frequencies, bands, and segments of radio spectrum (e.g., centimeter (cm) wave, millimeter (mm) wave, below 6 gigahertz (GHz), above 6 GHz, higher than mm wave, etc.). Spectrum type field 435 may include a list of available frequency bands for the current location specified in geography field 425.

Resource type field 440 may include a resource type to be used by the network slice in the RAN (e.g., delay-critical guaranteed bit rate (GBR), non-GBR, etc.). Default priority level field 445 may include a default priority value for network slice traffic. Packet delay budget field 450 may include a packet delay budget value for the slice. Packet error rate field 455 may include a packet error rate value. Default Maximum Data Burst Volume field 460 may include a default maximum data burst volume value. Default Averaging Window field 465 may include a default averaging window value associated with the network slice performance. Notification Control field 470 may include whether a QoS notification control indication (e.g., a QNC indication) may be used to instruct a base station to monitor whether measured QoS parameters meet the slice requirements. DSCP field 475 may include a DSCP value used for prioritizing traffic within a network.

Referring back to FIG. 3, slice planning tool 260 may obtain initial user input 302 to identify required parameters for a network slice. The customer required parameters may define basic service requirements for network services, such as a geographic service location (e.g., a region, an enterprise network location, a data center, etc.) and a performance criteria (e.g., data speeds, quality of service (QoS) levels, required bandwidth, latency, priority, etc.). In response to the customer required parameters, slice planning tool 260 may obtain, via communication 304, a RAN template from parameter forms DB 270 that meets the customer required parameters. For example, RAN designers (e.g., network engineers) may design RAN templates for different slice types which may be populated into parameter forms DB 270. Each RAN template may define, for example, where schedulers manage the RF in certain bands, on a certain footprint, with upload speeds and download speeds that are supported.

After selecting a RAN template, slice planning tool 260 may request, if needed, additional user input 302 to complete the required RAN parameters 305 for the RAN template. With the completed RAN parameters 305, slice planning tool 260 may proceed to obtain midhaul parameters 310.

Midhaul parameters 310 may include parameters for midhaul transport 220-3. Midhaul transport designers (e.g., network engineers) may design transport rules and parameters for different slice types which may be populated into parameter forms DB 270. Midhaul transport 220-3 may include a link between a DU (e.g., DU 240) and the CU (e.g., CU-UP 235) via, for example, an F1 interface. According to one implementation, the DU may be at the cell or hub and the CU may be in the SAP. Regarding mid-haul parameters 310, there may be several parameters that can be modified in the midhaul transport. One such parameter may be the CU end points, another may be the DSCP bits that define how traffic is treated and the type of traffic, such as non-GBR and GBR. Other factors may be the types of transport that are available in a selected region—such as fiber, Ethernet, or microwave—and the slice ID and single network slice selection assistance information (S-NSSAI) value. Slice planning tool 260 may request, if needed, additional user input 302 to complete the required midhaul parameters 310.

Figure 5:
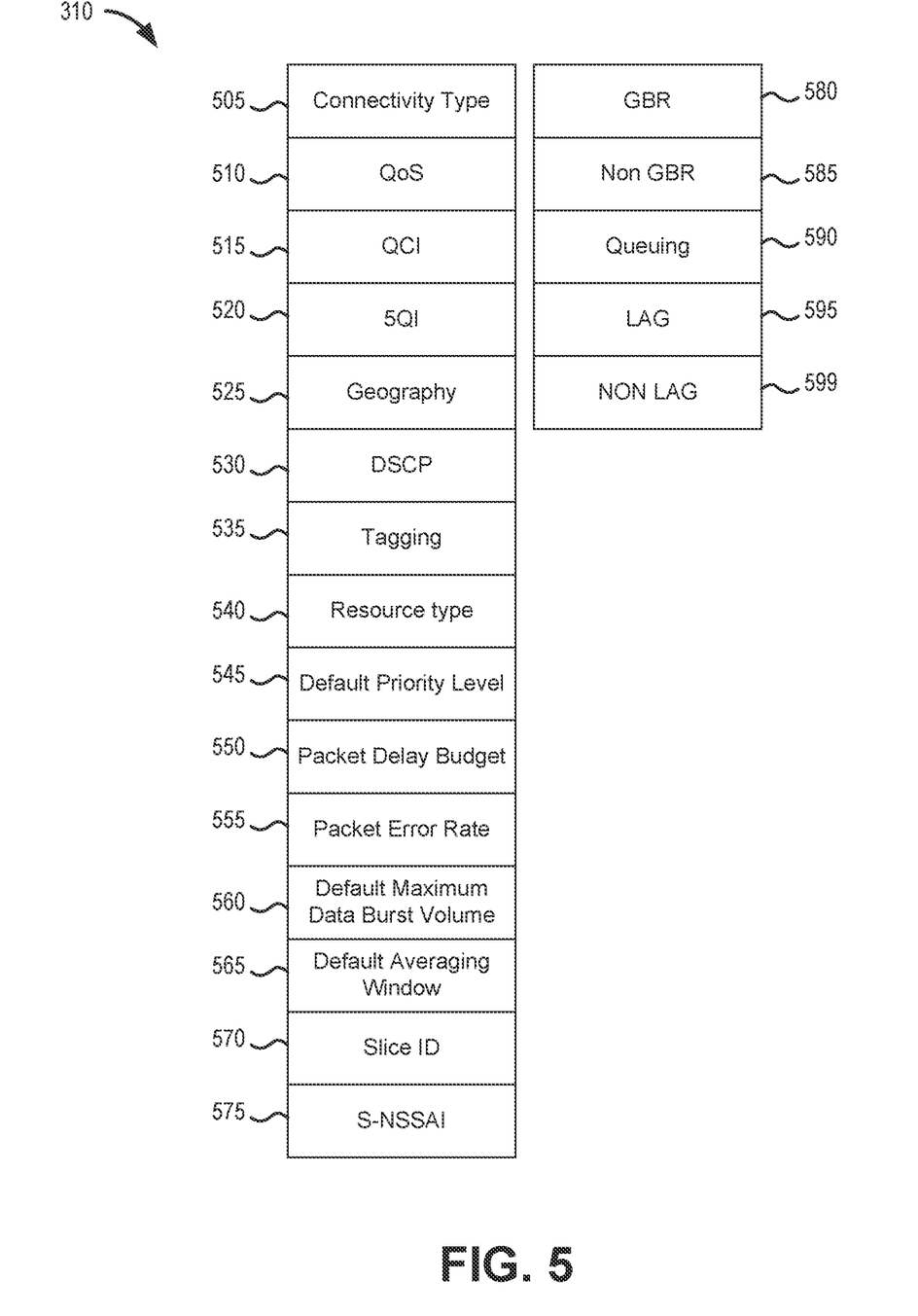
FIG. 5 is a diagram illustrating midhaul parameters for the slice planning tool, according to an implementation.

Midhaul parameters 310 may include, for example, parameters illustrated in FIG. 5. As shown in FIG. 5, midhaul parameters 310 may include a connectivity type field 505, a QoS field 510, a QCI field 515, a 5QI field 520, a geography field 525, DSCP field 530, a tagging field 535, a resource type field 540, a default priority level field 545, a packet delay budget field 550, a packet error rate field 555, a default maximum data burst volume field 560, a default averaging window field 565, a slice ID field 570, a S-NSSAI field 575, a GBR field 580, a non-GBR field 585, a queuing field 590, a link aggregation group (LAG) field 595, and a non-LAG field 599.

Connectivity type field 505 may indicate, for example, a type of connectivity for a midhaul link, such as fiber, Ethernet, or microwave, direct connectivity, or indirect connectivity, etc. QoS field 510, QCI field 515, 5QI field 520, geography field 525, and DSCP field 530 may correspond to fields 410, 415, 420, 425, and 475 of RAN parameters 305. Tagging field 535 may indicate any tagging requirements for protocol data units (PDU) using the network slice. Resource type field 540 may include a resource type to be used by the network slice in the midhaul transport (e.g., delay-critical GBR, non-GBR, standard GBR, etc.).

Default priority level field 545 may indicate a default priority level (e.g., a ranked level between 1 and 8) for the network slice. Packet delay budget field 550, packet error rate field 555, default maximum data burst volume field 560, and default averaging window field 565 may each include values relating to performance metrics for the network slice. According to one implementation, values for packet delay budget field 550, packet error rate field 555, default maximum data burst volume field 560, and default averaging window field 565 may correspond to certain values of QCI field 515 and/or 5QI field 520.

Slice ID field 570 may store a unique identifier for the network slice. In one implementation, the unique ID stored in Slice ID field 570 may correspond to an IP address for an access and mobility management function (AMF) instance that supports the network slice. S-NSSAI field 575 may store data that includes S-NSSAI. For example, S-NSSAI field 575 may include data that indicates a slice/service type (SST) value. The data may also include slice differentiator (SD) information, for example. GBR field 580 and non-GBR field 585 may store a GBR value or non-GBR value associated with the particular QoS class. Queuing field 590 may define a queue type/size. LAG field 595 and non-LAG field 599 may indicate whether the network slice can be associated with a ling aggregation group.

Slice planning tool 260 may perform network discovery to map a network environment. Slice planning tool may map the RAN QCI/5QI's (e.g., from QCI field 415 and/or 5QI field 420) to DSCP parameters from the Cell Site router to the TAP. As an initial step, slice planning tool 260 may map each cell site to each transport aggregation point. According to an implementation, slice planning tool 260 may also identify any intermediate aggregations points. In one implementation, slice planning tool 260 may use Common Language Location Identification (CLLI) codes to stitch together the constant bit rate (CBR) to the TAP sites. Next slice planning tool 260 may map the CBR from the TAP sites to the SAP sites. Slice planning tool 260 may map DSCP to Port Control Protocol (PCP) parameters.

Once a mapping of the network environment is available, slice planning tool 260 may apply midhaul transport rules from parameter forms DB 270. In one implementation, parameter forms DB 270 may include YANG files to define the structure and NETCONF files to configure the elements in the map.

SAP transport rules 315 provide rules for the link between the midhaul transport and the cloud platform infrastructure, along with the inter element communications. SAP transport rules 315 may include rules on how network elements (e.g., SMF, UPF, AMF, etc.) of the network slice are interconnected. As an example, SAP transport rules 315 may define the connection from a SMF to a UPF, firewall rules for a new SMF/UPF pair. SAP transport rules 315 may also identify locations from where to pull IP addresses, which may be used to instantiate the virtual machines for each network function. SAP transport rules 315 may include information to program segment routing (SR) fabric, such as routing to a firewall to Internet and back.

Charging parameters 320 may include one or more charging plan templates for customers to apply to a network slice. Examples of different charging plans may include sponsored data plans, monthly usage plans, charging per time on the network, etc. The different charging templates may be stored, for example, in parameter forms DB 270. Slice planning tool 260 may obtain user input 302 to identify charging parameters for the network slice and match the parameters to an available charging plan that can be retrieved as a template 304 from parameter forms DB 270.

Application transport rules 325 may identify a type of data traffic that the network slice is required to support. Examples of different traffic types include IPv6, IPv4, dual stack, Network Address Translated (NAT), Non-NAT, Non-IP Data Delivery, etc. Different application transport templates for the different traffic types may be stored, for example, in parameter forms DB 270. Slice planning tool 260 may obtain user input 302 to identify application transport parameters for the network slice and match the parameters to an available transport rules template that can be retrieved as a template 304 from parameter forms DB 270.

Roaming rules 330 may identify roaming profiles for the network slice. For example, roaming profiles may include permissions to allow or not allow roaming on 4G or 5G networks while using the network slice, or restrictions for roaming. Different roaming profile templates may be stored, for example, in parameter forms DB 270. Slice planning tool 260 may obtain user input 302 to identify application transport parameters for the network slice and match the parameters to an available roaming template that can be retrieved as a template 304 from parameter forms DB 270.

Reporting rules 335 may identify customer requirements for reporting. Reporting rules 335 may define report scope (e.g., slice level, enterprise level, etc.), frequency (e.g., weekly, monthly, etc.), content (e.g., QoS, usage statistics, etc.), and the like. Different reporting templates may be stored, for example, in parameter forms DB 270. Slice planning tool 260 may obtain user input 302 to identify reporting parameters for the network slice and match the parameters to an available reporting template that can be retrieved as a template 304 from parameter forms DB 270.

Wholesale rules 340 may provide rules governing "wholesale" arrangements, where one telecommunications carrier may purchase services from another telecommunications carrier and resell such services to retail customers. Different wholesale profiles may be stored, for example, in parameter forms DB 270. Slice planning tool 260 may obtain user input 302 to identify wholesale parameters for the network slice and match the parameters to an available wholesale profile that can be retrieved as a template 304 from parameter forms DB 270.

Security and services 345 may include settings for security and privacy-related services, such as firewalls, content filtering, anti-virus scanning, malware protection, etc. Other services may include protected IP pools, traffic shaping (e.g., video optimization, etc.), data speed reductions for usage caps, etc. Templates for different services/combinations may be stored, for example, in parameter forms DB 270. According to one implementation, features of security and services 345 may be implemented via domain name system (DNS) response police zones. In other implementations, features of security and services 345 may be implemented using an application function. Slice planning tool 260 may obtain user input 302 to identify different security and service requirements for the network slice and match the requirements to available security/service templates that can be retrieved as a template 304 from parameter forms DB 270.

Exposure function 350 may provide rules governing exposure of network slice data to outside of a provider network. Different exposure profiles may be stored, for example, in parameter forms DB 270. Slice planning tool 260 may obtain user input 302 to identify exposure parameters for the network slice and match the parameters to an available exposure profile that can be retrieved as a template 304 from parameter forms DB 270. According to one implementation, features of exposure function 350 may be implemented via a network exposure function (NEF).

OSS/BSS rules 355 may provide parameters for different OSS/BSS systems for the network slice. An OSS may include a network monitoring system, a network provisioning system, a network management system, a testing system, and/or other types of OSS. A BSS may include an ordering system, a customer service system, a billing system, or the like. Different OSS/BSS profiles may be stored, for example, in parameter forms DB 270. Slice planning tool 260 may obtain user input 302 to identify different OSS/BSS parameters for the network slice and match the parameters to an available OSS/BSS profile that can be retrieved as a template 304 from parameter forms DB 270.

Design engine 360 may incorporate customized templates from components 305-355 to generate a slice design for the network slice. The slice design may be an end-to-end network path of network components and/or services that contains pieces, such as service, NFs, and associated slice configurations applicable to each NF that makes up a slice. In one implementation, the final slice service package may be a TOSCA (Topology and Orchestration Specification for Cloud Applications) cloud services archive (CSAR) package 362. Design engine 360 may forward the CSAR package to deployment system 290 for instantiation.

Figure 6:
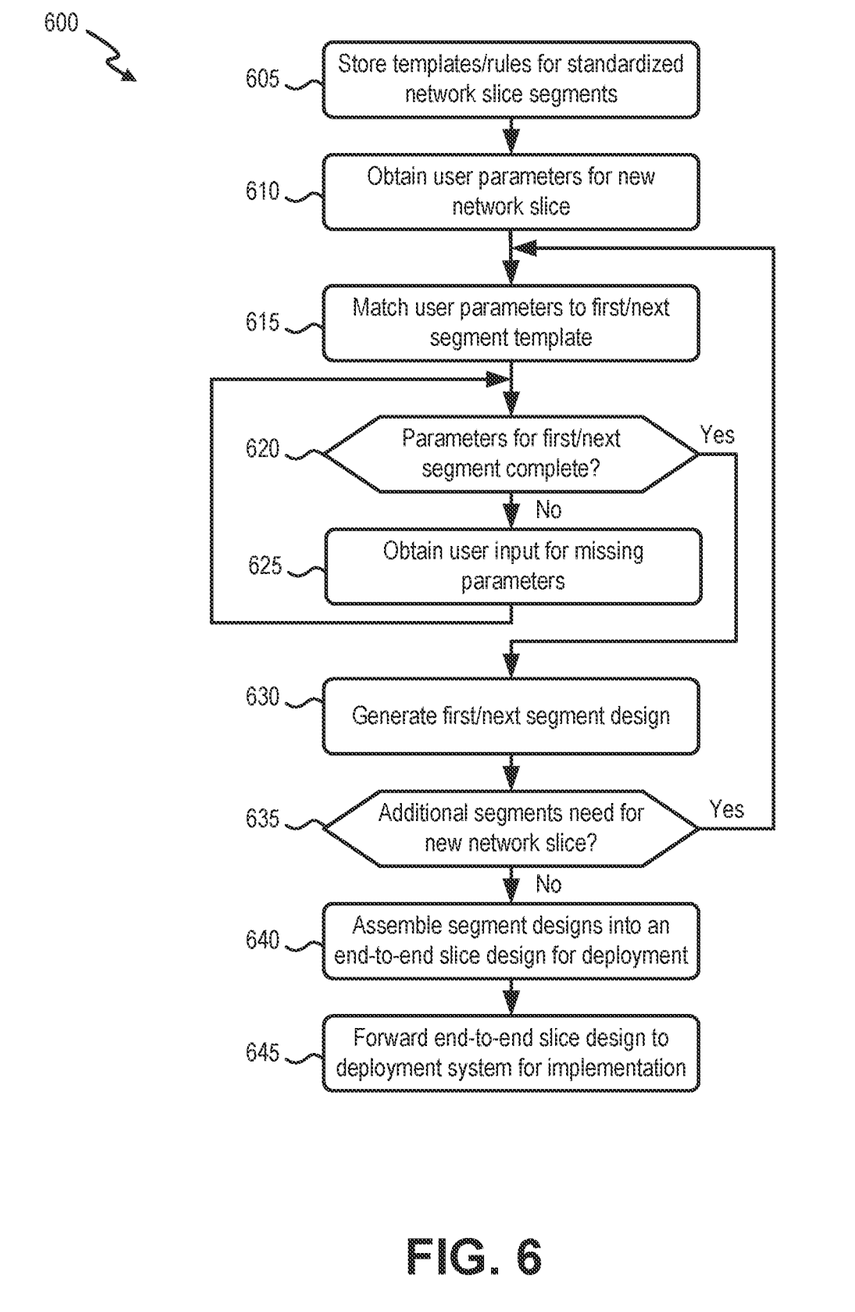
FIG. 6 is a flow diagram illustrating an exemplary process for automated end-to-end network slice deployment, according to an implementation.

FIG. 6 is a flow diagram illustrating an exemplary process 600 for automated end-to-end network slicing deployment, according to implementations described herein. In one implementation, process 600 may be implemented by slice planning tool 260. In another implementation, process 600 may be implemented by slice planning tool 260 in conjunction with one or more other devices in network management section 210, such as customer ordering platform 250, parameter forms DB 270, design system interface 280, and/or deployment system 290.

Process 600 may include storing templates and/or rules for standardized network slice segments (block 605). For example, network teams (e.g., design/engineering teams) may generate a set of standard templates or rule sets for different network segments (e.g., RAN segment, midhaul transport segment, SAP transport segment, application transport segment, fronthaul segment, security and services segments, etc.). As an example, network teams may design RAN templates for different service levels. Each standard RAN template may have a set of parameters that may be supplemented and/or configured as part of a customer ordering process. As another example, network teams may develop a rules set for mapping midhaul transport links to support a RAN segment design. The standard templates and/or rules may be stored, for example, in parameter forms DB 270.

Process 600 may further include obtaining user parameters for a new network slice (block 610). For example, a customer may log into customer ordering platform 250 to initiate a new network slice (e.g., to support services for a third party application, enterprise services, etc.). Customer ordering platform 250 may provide a user interface to solicit customer requirements, such as a geographic service location and performance criteria. Customer ordering platform 250 may forward the customer requirements to slice planning tool 260.

Process 600 may also include matching the user parameters to a first segment template (block 615) and determining if the parameters for the first network slice segment are complete (block 620). For example, slice planning tool 260 may match the customer requirements to one of the standard templates for a first segment. Slice planning tool 260 may retrieve, from the group of preconfigured templates in parameter forms DB 270, a template that satisfies the customer parameters for a first network slice segment. That is, slice planning tool 260 may find a best fit template or a template using the least amount of network resources to satisfy the customer requirements. For subsequent (i.e., next) segments, slice planning tool 260 may find a best fit template to satisfy the customer requirements and support the previous segment designs. In one implementation, when the first slice segment corresponds to a RAN, slice planning tool 260 may determine if the initial customer requirements provide sufficient detail to complete all the necessary RAN parameters 305 for the selected template. In another implementation, when a second slice segment corresponds to a midhaul transport, slice planning tool 260 may determine if the initial customer requirements provide sufficient detail to complete all necessary midhaul parameters 310 for the selected template and are compatible with the RAN segment design.

If the parameters for the first network slice segment are not complete (block 620—No), process 600 may include obtaining user input for missing parameters (block 625). For example, if the initial customer requirements do not provide sufficient detail to complete all the necessary parameters for the selected template, slice planning tool 260 may request additional customer input via customer ordering platform 250. For example, slice planning tool 260 may request additional RAN parameters 305. In another implementation, slice planning tool 260 may use design system interface 280 to obtain additional network information needed to obtain additional information for the network slice segment.

If the parameters for the first network slice segment are complete (block 620—Yes), process 600 may include generating a first network slice segment design (block 630) and determining if additional network slice segments are needed (block 635). For example, if the initial customer requirements or supplemented customer requirements provide sufficient detail to complete all the necessary parameters for the selected RAN template, slice planning tool 260 may generate a RAN segment design. Slice planning tool 260 may then determine if additional segment are needed to complete the network slice design for the customer. According to an implementation, slice planning tool 260 may proceed through an ordered sequence to design modular slice components (or segments) for the RAN, midhaul transport, SAP transport, application transport, charging, security, exposure, and OSS/BSS.

If additional network slice segments are needed (block 635—Yes), process 600 may return to process block 615 to match user parameters to the next network slice segment template. For example, after completing a RAN segment design for the new network slice, slice planning tool 260 may select a rule set or template for midhaul parameters 310. Furthermore, if a midhaul transport segment design is completed, slice planning tool 260 may select appropriate SAP transport rules 315, and so forth.

If no additional network slice segments are needed (block 635—No), process 600 may include assembling the network slice segment designs for deployment (block 640) and forwarding a slice deployment package to a deployment system for implementation (block 645). For example, if parameters for all the needed segments have been obtained and the individual segment designs completed, slice planning tool 260 may compile the individual segment designs into a package for deployment (e.g., a CSAR file). Slice planning tool 260 may forward the compiled package to deployment system 290 for instantiation/deployment within data transport network section 205.

Figure 7:
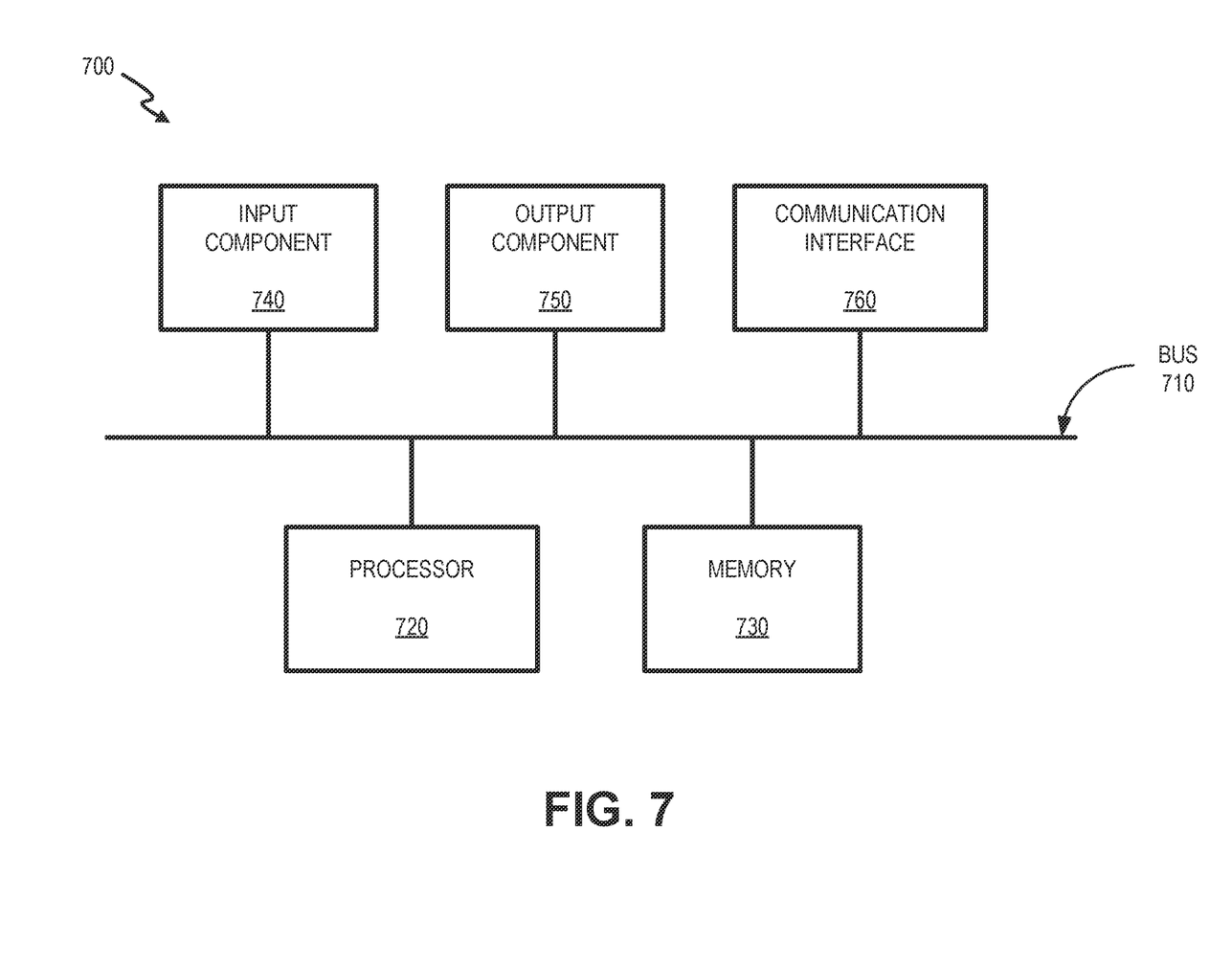
FIG. 7 is a diagram illustrating example components of a device that may correspond to one or more of the devices illustrated and described herein.

FIG. 7 illustrates example components of a device 700 according to an implementation described herein. Components of network devices 215, customer ordering platform 250, slice planning tool 260, parameter forms DB 270, design system interface 280, deployment system 290, and other network devices in network environment 200 may each include or be implemented on one or more devices 700. Device 700 may include a bus 710, a processor 720, a memory 730, an input component 740, an output component 750, and a communication interface 760.

Bus 710 may include a path that permits communication among the components of device 700. Processor 720 may include a processor, a microprocessor, or processing logic that may interpret and execute instructions. Memory 730 may include any type of dynamic storage device that may store information and instructions, for execution by processor 720, and/or any type of non-volatile storage device that may store information for use by processor 720. Input component 740 may include a mechanism that permits a user to input information to device 700, such as a keyboard, a keypad, a button, a switch, etc. Output component 750 may include a mechanism that outputs information to the user, such as a display, a speaker, one or more light emitting diodes (LEDs), etc.

Communication interface 760 may include a transceiver that enables device 700 to communicate with other devices and/or systems via wireless communications, wired communications, or a combination of wireless and wired communications. For example, communication interface 760 may include mechanisms for communicating with another device or system via a network. Communication interface 760 may include an antenna assembly for transmission and/or reception of RF signals. For example, communication interface 760 may include one or more antennas to transmit and/or receive RF signals over the air. In one implementation, for example, communication interface 760 may communicate with a network and/or devices connected to a network. Alternatively, or additionally, communication interface 760 may be a logical component that includes input and output ports, input and output systems, and/or other input and output components that facilitate the transmission of data to other devices.

Device 700 may perform certain operations in response to processor 720 executing software instructions contained in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions contained in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

Although FIG. 7 shows exemplary components of device 700, in other implementations, device 700 may contain fewer components, additional components, different components, or differently arranged components than those depicted in FIG. 7. For example, device 700 may include one or more switch fabrics instead of, or in addition to, bus 710. Additionally, or alternatively, one or more components of device 700 may perform one or more tasks described as being performed by one or more other components of device 700.

Systems and methods described herein enable automation of network slice deployments. A device stores a group of preconfigured templates for different slice segments of a data transport network and identifies customer parameters for a slice. The device retrieves a first template that satisfies the customer parameters for a first slice segment and generates a first segment design for the slice. The device retrieves a second template that supports the first segment design and customer parameters for a second slice segment and generates a second segment design for the slice. The device may also retrieve a third template that supports the customer parameters and the second segment design and generates a third segment design for the slice. The device assembles an end-to-end slice design using the first segment design, the second segment design, and the third segment design and forwards the end-to-end slice design to a deployment system for the data transport network.

The foregoing description of implementations provides illustration and description, but is not intended to be exhaustive or to limit the invention to the precise form disclosed. Modifications and variations are possible in light of the above teachings or may be acquired from practice of the invention. Also, while a series of blocks have been described with regard to FIG. 6 the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A network device comprising:
   one or more processors configured to:
   store, in a memory, a plurality of preconfigured templates for different network slice segments of a data transport network;
   obtain user input to identify customer parameters for a network slice in the data transport network;
   retrieve, from the plurality of preconfigured templates, a first template that satisfies the customer parameters for a first network slice segment;
   generate, based on the first template and the customer parameters, a first segment design for the network slice;
   retrieve, from the plurality of preconfigured templates, a second template that meets the customer parameters for a second network slice segment and supports the first segment design;
   generate, based on the first segment design, the second template and the customer parameters, at least one second segment design for the network slice;
   assemble an end-to-end slice design using the first segment design and the at least one second segment design; and
   forward the end-to-end slice design to a deployment system for the data transport network.

2. The network device of claim 1, wherein the customer parameters include a geographic service location and performance criteria.

3. The network device of claim 1, wherein the one or more processors are further configured to:
   obtain, after retrieving the first template, additional user input to complete parameters in the first template.

4. The network device of claim 1, wherein the one or more processors are further configured to:
   retrieve, from the plurality of preconfigured templates, a third template that meets the customer parameters and supports the second segment design; and
   generate, based on the second segment design, the third template and the customer parameters, a third segment design for the network slice.

5. The network device of claim 4, wherein the first segment design includes a RAN segment design, wherein the at least one second segment design includes a midhaul transport segment design, wherein the third segment design includes a service aggregation point (SAP) transport segment design with a user plane function (UPF) and session management function (SMF) pair.

6. The network device of claim 1, wherein, when generating the third segment design for the network slice, the one or more processors are further configured to:
   retrieve a rule set for SAP transport; and
   instantiate, based on the rule set, a session management function (SMF) and user plane function (UPF) for the network slice.

7. The network device of claim 1, wherein the one or more processors are further configured to:
   implement the end-to-end slice design in the data transport network.

8. The network device of claim 1, wherein, when generating the at least one second segment design for the network slice, the one or more processors are further configured to:
   obtain mapping of quality of service (QoS) indicators in a radio access network (RAN) segment to differentiated services code point (DSCP) values in a midhaul transport; and
   arrange the mappings to a geographic area based on the customer parameters.

9. The network device of claim 1, wherein, when assembling the end-to-end slice design, the one or more processors are further configured to:
   assign, based on the user input, a type of data traffic for the network slice.

10. The network device of claim 1, wherein, when assembling the end-to-end slice design, the one or more processors are further configured to:
    obtain, based on the user input, a charging plan for the network slice.

11. The network device of claim 1, wherein, when assembling the end-to-end slice design, the one or more processors are further configured to:
    retrieve, from the plurality of preconfigured templates, a security template that meets the customer parameters.

12. A method comprising:
    storing a plurality of preconfigured templates for different network slice segments of a data transport network;
    obtaining, by a network device of a management network for the data transport network, user input to identify customer parameters for a network slice in the data transport network;
    retrieving, by the network device and from the plurality of preconfigured templates, a first template that satisfies the customer parameters for a first network slice segment;
    generating, by the network device and based on the first template and the customer parameters, a first segment design for the network slice;
    retrieving, by the network device and from the plurality of preconfigured templates, a second template that meets the customer parameters for a second network slice segment and supports the first segment design;
    generating, by the network device and based on the first segment design, the second template and the customer parameters, at least one second segment design for the network slice;

assembling, by the network device, an end-to-end slice design using the first segment design and the at least one second segment design; and forwarding by the network device, the end-to-end slice design to a deployment system for the data transport network.

13. The method of claim 12, wherein obtaining the user input to identify the customer parameters includes:

obtaining a geographic service location and a performance criteria for the network slice.

14. The method of claim 12, further comprising:

obtaining, after retrieving the first template, additional user input to complete parameters in the first template.

15. The method of claim 12, further comprising:

instantiating network functions for the end-to-end slice design in the data transport network.

16. The method of claim 12, wherein generating the second segment design for the network slice further comprises:

obtaining mapping of Quality of Service (QoS) indicators in a Radio Access Network (RAN) segment to Differentiated Services Code Point (DSCP) values in a midhaul transport; and arranging the mappings to a geographic area based on the customer parameters.

17. The method of claim 16, wherein arranging the mappings includes:

mapping each cell site in the first segment design to a transport aggregation point, wherein the mapping applies Common Language Location Identification (CLLI) codes to identify paths to transport aggregation sites; and mapping each transport aggregation point to a service aggregation point.

18. A non-transitory, computer-readable storage media storing instructions, which, when executed by one or more processors of a network device, cause the network device to:

store a plurality of preconfigured templates for different network slice segments of a data transport network;

obtain user input to identify customer parameters for a network slice in the data transport network;

retrieve, from the plurality of preconfigured templates, a first template that satisfies the customer parameters for a first network slice segment;

generate, based on the first template and the customer parameters, a first segment design for the network slice;

retrieve, from the plurality of preconfigured templates, a second template that meets the customer parameters for a second network slice segment and supports the first segment design;

generate, based on the first segment design and the customer parameters, at least one second segment design for the network slice;

assemble an end-to-end slice design using the first segment design and the at least one second segment design; and forward the end-to-end slice design to a deployment system for the data transport network.

19. The non-transitory, computer-readable storage media of claim 18, wherein the instructions to assemble the end-to-end slice design further include instructions to:

assign, based on the user input, a type of data traffic for the network slice; and obtain, based on the user input, a charging plan for the network slice.

20. The non-transitory, computer-readable storage media of claim 18, wherein the instructions to assemble the end-to-end slice design further include instructions to:

identify different Operations Support System (OSS) or Business Support System (BSS) parameters for the network slice and match the parameters to an available OSS/BSS profile in the plurality of preconfigured templates.

\* \* \* \* \*